No. 660,687.  
A. J. JOHNSON.  
PEA THRESHER.  
(Application filed Nov. 28, 1899.)  
Patented Oct. 30, 1900.
(No Model.)  
2 Sheets—Sheet 1.
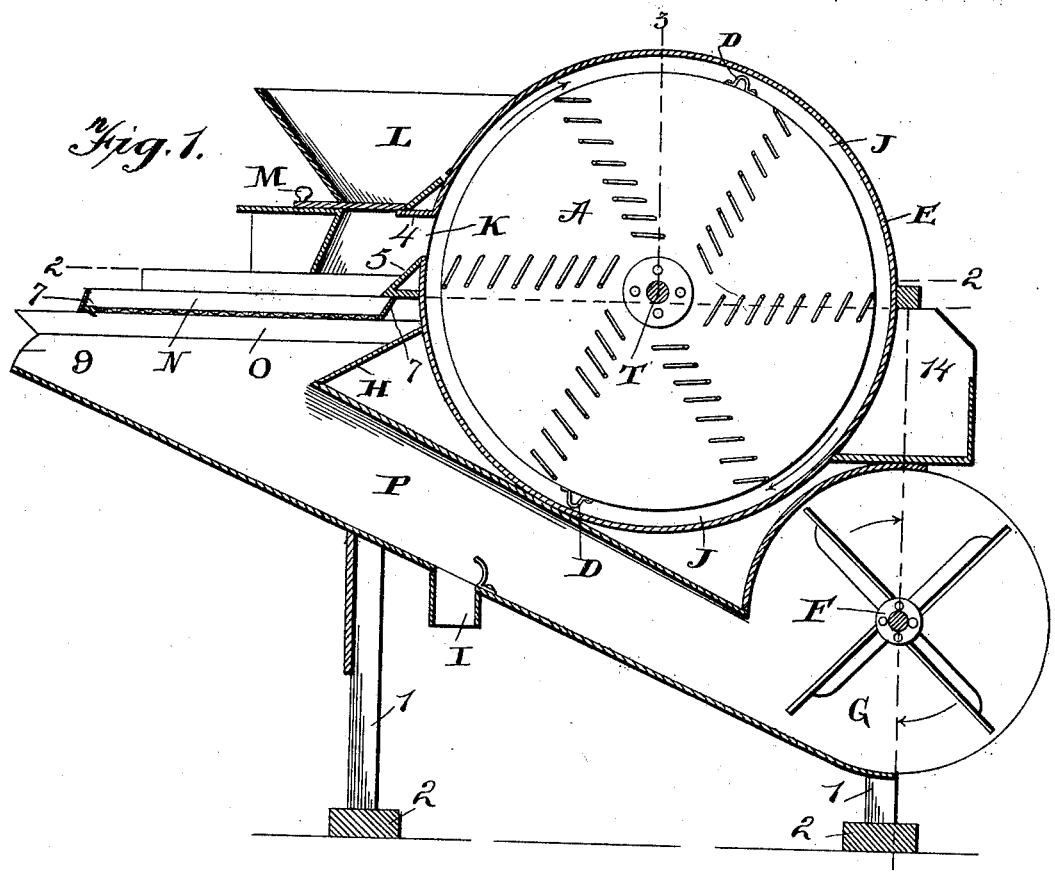
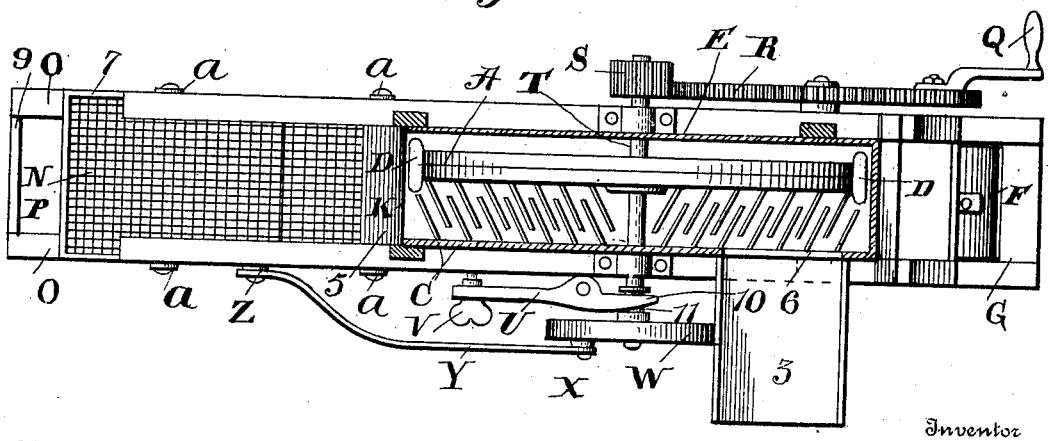
Witnesses  
Geo. E. Frech.  
Chas. P. Wright
Inventor  
Andrew J. Johnson,  
by A. S. Pattison,  
Attorney.

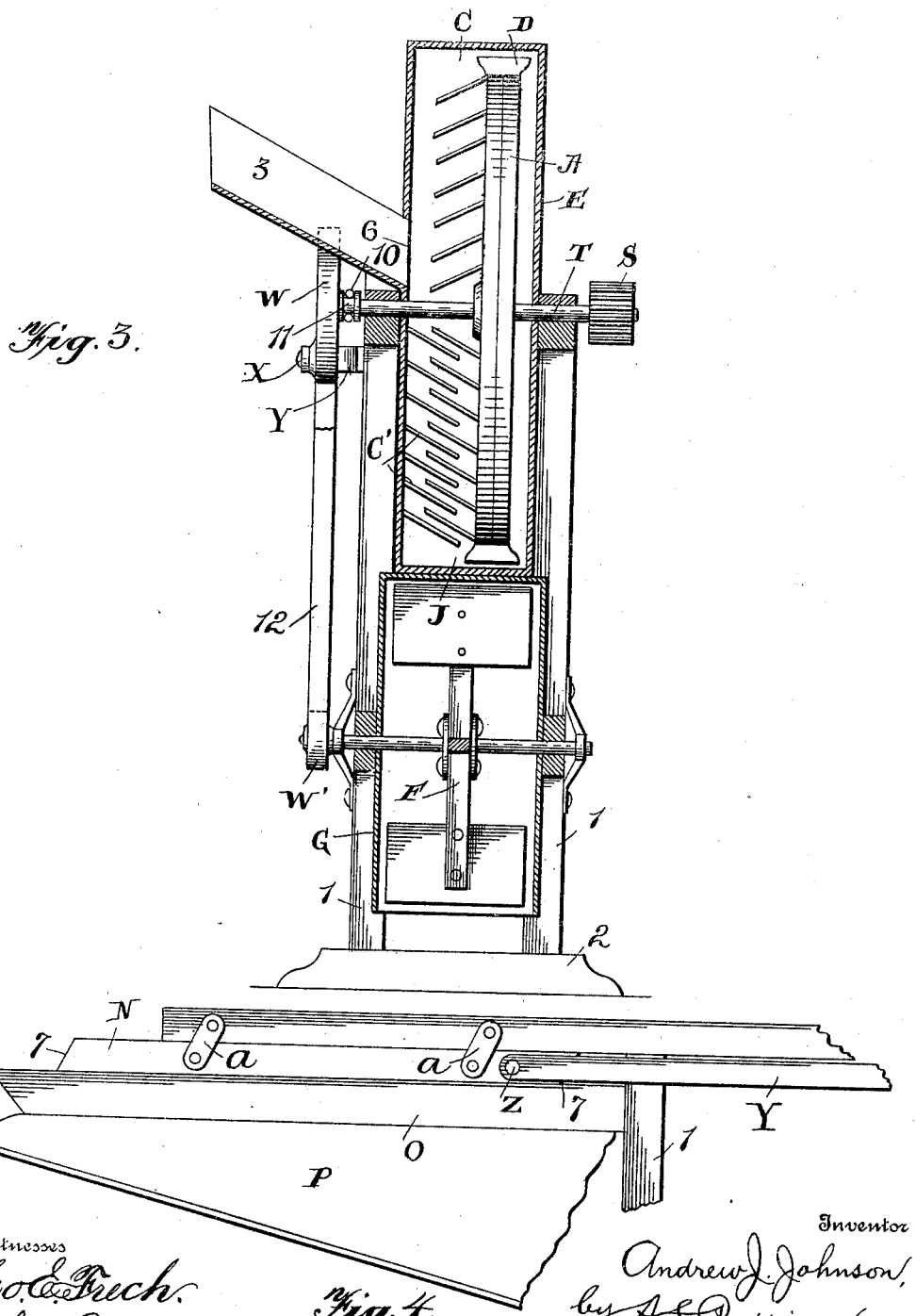

UNITED STATES PATENT OFFICE.

ANDREW JACKSON JOHNSON, OF ETHEL, MISSISSIPPI.

PEA-THRESHER.

SPECIFICATION forming part of Letters Patent No. 660,687, dated October 30, 1900.

Application filed November 28, 1899. Serial No. 738,579. (No model.)

*To all whom it may concern:*

Be it known that I, ANDREW JACKSON JOHNSON, a citizen of the United States, residing at Ethel, in the county of Attala and State of Mississippi, have invented new and useful Improvements in a Combined Pea Huller and Separator, of which the following is a specification.

My invention relates to improvements in combined pea hullers and separators; and it consists in the construction and arrangement of parts hereinafter fully described, and particularly pointed out in the claims.

The peas to be hulled or shelled may be fed to the machine separate from their vines or vines and peas together fed to the machine, as desired, and the peas will be shelled and delivered to a separator for separating them from the shells and vines, and which is also constructed to permit of a second separating and cleaning operation without passing them through the threshing mechanism.

In the accompanying drawings, Figure 1 is a vertical central sectional view of a machine embodying my invention. Fig. 2 is a central horizontal sectional view on the line 2 2 of Fig. 1. Fig. 3 is a vertical sectional view on the line 3 3 of Fig. 1. Fig. 4 is a detached view of the screen, its supporting-links, pitman connection, and the funnel or guide situated therebeneath.

Referring now to the drawings, 1 indicates a vertically-arranged frame having the base-pieces 2 for supporting the same in an operative position. Suitably supported in the upper portion of this framework is a threshing-chamber E, which is circular in form, as shown, and is provided with an outlet-opening K, preferably above the horizontal line drawn through the axis of the threshing-chamber E. The threshing-wheel A is suitably attached to a shaft T, which carries on one end a wide pinion S, which meshes with and is driven by the driving-gear R, said gear R being journaled in any suitable manner to the frame of the machine and provided with an operating-handle Q.

One side of the threshing-wheel A is provided with a plurality of series of threshing pins or spikes C, the said spikes or pins being arranged in lines which are tangential to the axis of the threshing-wheel, as clearly illustrated in Fig. 1. As illustrated in Fig. 3, the threshing pins or spikes are arranged at a diagonal angle to the face of the threshing-disk, and the coacting threshing pins or spikes C' upon the adjacent inner side of the threshing-chamber E are arranged in a corresponding angle, but extending in the reverse direction to those upon the said threshing-wheel at the feeding-point of the machine.

The threshing-chamber E is provided with a feed passage or opening 6, which extends through that side of the chamber which contains the threshing-pins and at a point about in a horizontal line with the axis of the threshing-disk and is preferably elongated horizontally. A feed box or trough 3 has its inner end in communication with the feed-opening 6, and the peas to be shelled or hulled are placed in the inclined feed box or trough and pass from thence into the threshing-chamber to be acted upon by the threshing spikes or pins.

As clearly illustrated, the threshing-wheel A is of a diameter less than the diameter of the threshing-chamber, thus leaving a pea-elevating space J between the periphery of the threshing-wheel and the inner periphery of the threshing-chamber. The periphery of the threshing-wheel A is provided with one or more elevating loops, cups, or members D, adapted to about fill the said elevating chamber or space J. These loops, cups, or elevating members serve to carry the threshed material, including the peas, to the outlet-opening K, from which they are delivered upon the separating-sieve N. This separating-sieve N is provided with the sides and ends 7, thus constituting a sieve box or trough, the sieve forming the bottom thereof, and thus adapted to hold the threshed material while the peas are being separated therefrom by a combined shaking and air-blast action. The sieve-box is supported upon the links a, which have their ends pivotally connected, respectively, with the sides of the sieve and with the frame of the machine. Situated below the sieve-box and of greater length than the sieve-box is a guide or funnel O, through which the peas and other small articles consequent to the threshing operation pass and into the upper end of the combined air-flue and pea-receiving tube or flue P. The lower end of this flue or tube P is in communication with a fan-housing G, in which is placed a fan F, one end of the shaft of said fan projecting through the frame of the machine and carries a pulley W', through the medium of which the fan is operated, as will be described hereinafter. A transversely-inclined trough I is in communication with the lower side of the flue P, and into which trough the peas pass as they roll down the inclined flue, as will be readily understood, and from the trough I they fall into any receptacle set to receive them. The upper side of the upper end of the flue P extends upwardly and inwardly at an angle, as illustrated at H, and under the guide or trough O, whereby all the threshed material which passes through the sieve is guided into the upper end of the flue P, to be acted upon by the air-blast.

The opposite end of the shaft T from the pinion S is provided with a combined balance and pitman wheel W, carrying a wrist-pin X, to which one end of a pitman Y is attached, the upper end of the pitman being suitably attached to a stud or similar connection Z, carried by one side of the sieve frame or box, and by means of which the sieve is reciprocated for the purpose of effecting a separation of the small particles of the threshed material in the separating operation. It will be noted that the upper end of the flue P is in communication with the sieve N through the guide O, so that a greater portion of the air-blast is forced through the sieve N, thus driving the shells and the threshed vines out of the sieve-box, while the peas, which are heavier, will drop through the sieve into the flue P and roll down into the trough I, as before explained, while the smaller and lighter particles which have also found their way through the sieve will be driven out of the contracted passage 9 at the outer end of the flue P and just below the outer end of the guide or funnel O, thus more thoroughly effecting a cleaning and a separation of the peas from the threshed shells and vines.

For the purpose of regulating the length of the engaging surfaces of the threshing-pins of the threshing-wheel and the threshing-chamber the shaft T, which carries the threshing wheel or disk, is longitudinally movable in its bearings, and for the purpose of moving the said shaft, and thus adjusting the threshing-pins in relation to each other, a lever U is intermediately pivoted to the frame, having one end 10 engaging a groove 11 in the said shaft and its opposite end regulated by means of a thumb-screw V, having one end attached to the frame of the machine. A belt 12 passes around the pulleys W and W' and serves to drive the fan through the shaft of the threshing-disk A.

For the purpose of enabling the machine to be used for refanning or recleaning the peas after they have passed through the above-described operation I provide a hopper L, situated just above the outlet-passage K of the threshing-chamber, the said hopper L having a portion 4 of its bottom extending outside of the said passage-way and provided with an adjustable valve M for regulating the passage of the peas and small unseparated particles therethrough at the desired speed. The peas and the unseparated small particles will fall through the opening in the bottom of the hopper L, a portion of them striking the outwardly-inclined surface 5, and are thus entirely guided away from the threshing mechanism and onto the sieve N, where they are again subjected to a second cleaning and fanning operation for the purpose of entirely separating from the peas all foreign particles.

For the purpose of enabling the threshing-wheel to be moved laterally and its shaft longitudinally for adjusting the length of the engaging surfaces of the threshing-teeth the pinion S is made with elongated teeth; whereby the inward movement of the shaft will not carry it out of engagement with the driving-gear R, and thus permitting an adjustment of the threshing-wheel as may be desired.

A tool-box 14 is arranged at the rear side of the threshing-chamber E for the purpose of receiving any tools which may be thought necessary in the operation of the machine.

By means of a machine of the above-described construction I produce a combined huller and separator which is simple in construction, cheap to produce, effective in its operation, and by means of which the peas are first subjected to a combined threshing and separating operation and can be subjected to a second cleaning and separating operation independent of the threshing mechanism.

While I have described the fanning part of my machine as being adapted to refan any of the peas which are passed through the threshing part of my machine which it may be considered advisable to refan, it will be readily understood that this part of my invention can be used for fanning out peas which have been beaten out, and also for fanning oats, corn, &c., without departing from the spirit and scope of my invention.

Having thus described my invention, what I claim, and desire to secure by Letters Patent, is—

1. A pea-huller comprising a threshing-chamber having an outlet above the bottom thereof, a threshing-disk situated therein, threshing-teeth attached to one side of said disk, threshing-teeth attached to the side of the chamber adjacent the teeth carried by the disk, elevating-cups attached to the outer periphery of the disk, a chamber surrounding the outlet of the threshing-chamber, a sieve below said chamber and a hopper situated on top of said chamber and discharging therein above the discharge-opening in the threshing-chamber, substantially as described.

2. A combined pea huller and separator comprising a threshing-chamber provided with a feed-opening in one side and an outlet in the end at a point above the bottom thereof, a threshing-disk within the said chamber, elevating-cups attached to the outer periphery of the threshing-disk, a reciprocating sieve below the outlet-opening, a hopper adjacent the outlet-opening and having a discharge-opening thereabove, a fan below the threshing-chamber, and a spout extending from the fan to the lower part of the sieve and provided with an outlet-opening in its lower face, substantially as described.

3. A combined pea huller and separator comprising a threshing-chamber provided with a feed-opening in one side, threshing-teeth attached to the inner face of said side, said chamber having an outlet at one end above the horizontal axis, a threshing-disk within said chamber and having threshing-teeth on one side adjacent the side carrying the threshing-teeth, elevating-cups attached to the outer periphery of the threshing-disk, a reciprocating sieve below the outlet-opening, a fan below the threshing-chamber, and a spout extending from the fan nearly to the outlet-opening and provided on its lower face with a discharge-opening, substantially as described.

In testimony whereof I have hereunto set my hand in the presence of two subscribing witnesses.

ANDREW JACKSON JOHNSON.

Witnesses:
D. F. LOVE,
C. H. CAMPBELL.